(No Model.)  3 Sheets—Sheet 1.

A. NEWELL.
REED ORGAN.

No. 253,882.  Patented Feb. 21, 1882.

Witnesses:
Frank Thomason
F. W. Kasehagen.

Inventor:
Augustus Newell
By Wm H Lotz
Attorney (No Model.) 3 Sheets—Sheet.2.
A. NEWELL.
REED ORGAN.
No. 253,882. Patented Feb. 21, 1882.
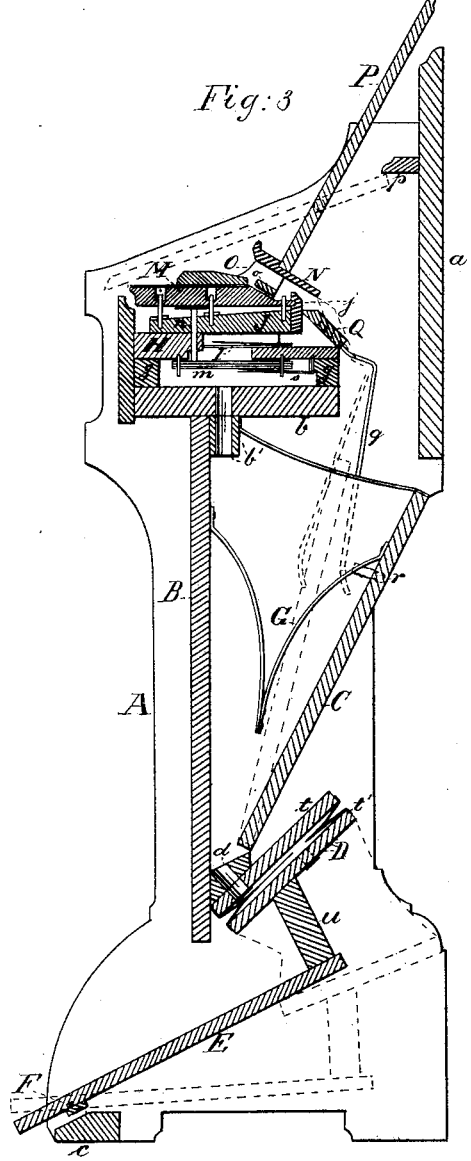
Fig: 3
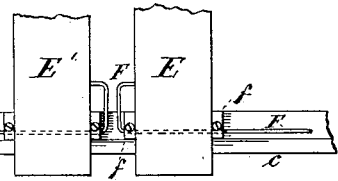
Fig: 4.
Witnesses:
Frank Thomason
F. W. Kasehagen.
Inventor:
Augustus Newell
By Wm H Lotz
Attorney (No Model.)
3 Sheets—Sheet 3.
A. NEWELL.
REED ORGAN.
No. 253,882.    Patented Feb. 21, 1882.
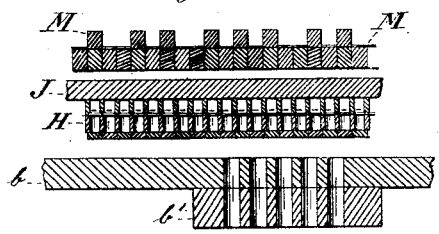
Fig: 5.
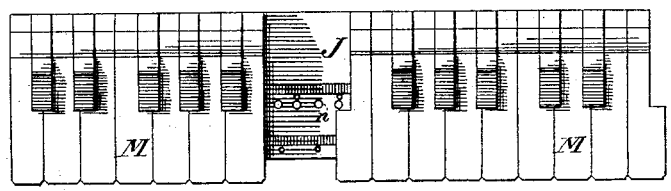
Fig: 6.
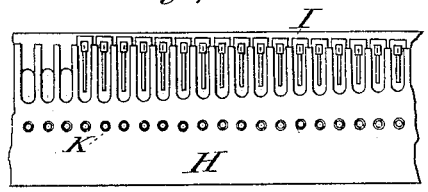
Fig: 7.
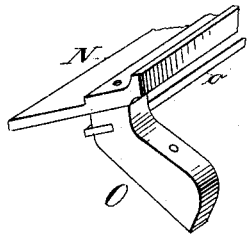
Fig. 9.
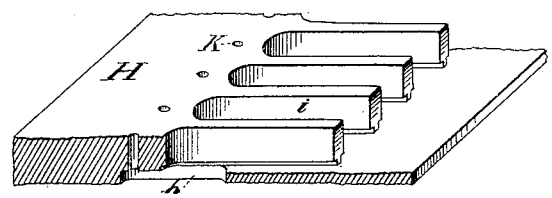
Fig. 8.
Witnesses:
Frank Thomason
F. W. Kasehagen.
Inventor:
Augustus Newell
By Wm H Lotz
Attorney

UNITED STATES PATENT OFFICE.

AUGUSTUS NEWELL, OF CHICAGO, ILLINOIS.

REED-ORGAN.

SPECIFICATION forming part of Letters Patent No. 253,882, dated February 21, 1882.

Application filed August 24, 1881. (No model.)

*To all whom it may concern:*

Be it known that I, AUGUSTUS NEWELL, of Chicago, in the county of Cook and State of Illinois, have invented a certain new and useful Improvement in Reed-Organs, of which the following is a specification.

This invention relates to organs for children's use; and it is the object of my invention to produce an organ which is simple and substantial in its construction, is easily taken apart for repairs or adjustment, and yet will enable the performer to make good music.

Therefore my invention consists of the construction and arrangement and combination of parts, as hereinafter described and specifically claimed.

Figure 1:
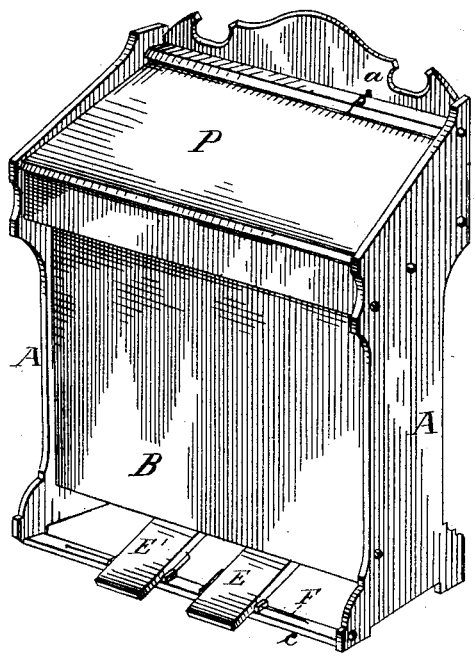
Figure 2:
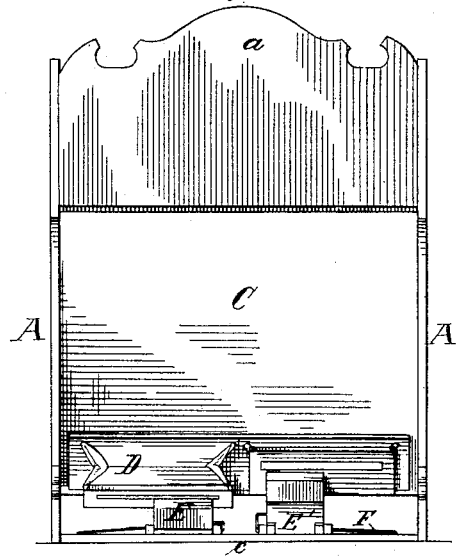

In the accompanying drawings, forming a part hereof, Figure 1 represents an exterior perspective view of the organ; Fig. 2, a rear elevation of the same, the right-hand feeder-pedal being pressed down. Fig. 3 is a vertical cross-section of the organ, showing the form and arrangement of its action; Fig. 4, a detached plan view of the pedals, showing their pivotal spring-connection to the base of the organ; Fig. 5, a longitudinal section of a portion of the key-reed and throat-boards of the organ; Fig. 6, a plan view of the key-board detached, with several of the keys removed. Fig. 7 is a plan view of the reed-board with several of the reeds removed. Fig. 8 represents a sectional perspective view of a portion of the reed-board, and Fig. 9 a perspective view of one end of the bridge-board and cushioned slat with one key-block.

Like letters denote corresponding parts in all the figures.

The case of this organ is composed of a back board, $a$, front board, B, throat-board $b$, and base or pedal strip $c$, all of which being of uniform length are secured by wood-screws between two side standards, A. The front board, B, of the case at the same time forms one side of the bellows-reservoir, a strip, $d$, being secured against its rear lower end, to which the back board, C, of the bellows-reservoir is hinged by girth-webbing or other suitable fabric. The block $b'$ of the throat-board $b$ extends into the bellows-reservoir, and through its perforations the air will enter after having passed the reeds.

The air from the bellows-reservoir is exhausted by two feeders, D D', through openings in strip $d$. The feeders D D' are each composed of two rectangular boards, $t$ and $t'$, that are connected by sheet-rubber or any other suitable material, one of these boards, $t$, being secured to strip $d$, with an internal flap-valve to the communicating opening, while the other board, $t'$, is secured to the end of one of the pedals, E, by an intermediate block, $u$, and has a breathing-hole that is covered by an exterior flap-valve. By thus rigidly connecting the feeders to the treadles the construction is much simplified and the operation is more noiseless than with the use of connecting-bars, or with cords and pulleys.

The pedals E E' with their front ends are pivotally connected to the base-strip $c$. These pivots are formed each by a wire, F, passed through a proper hole or groove in the pedal and held to the strip $c$ by two clamps $f$. Each wire F has a hook-point to its extended end, which is driven into strip $c$, and at its opposite end it is bent to have a rectangular arm with a hook that enters a hole in the pedal. In this way the torsional elasticity of the wire that forms the pivot will also furnish the necessary spring-power for raising the pedal again after each depression.

The distension of the bellows-reservoir is caused by a V-spring, G, and its contraction by the air being drawn or pumped out of it. Upon the sides and ends of the throat-board $b$ is secured a rectangular frame, $g$, and upon this the reed-board H, the manner of construction of which is shown in Figs. 5, 7, and 8.

Heretofore reed-boards were made of two pieces of wood that were first cut to the proper shape and then glued together for forming the proper cells for the reeds. This has been an expensive mode of manufacture to make them, besides that the grooves for the reeds in that construction could not be brought close to the bottom of the cell, and had to be made airtight under their ends by pieces of felting.

My reed-board H, as will be noticed, is made of a single piece of wood, and for this purpose I take a board of proper thickness and of the necessary width and length, and cut and plane it down longitudinally to give the board the required exterior shape. Next, with a proper machine-tool I cut the sockets $h$, then I bore slots that form the rear rounded ends for the reed-cells $i$, which in the next operation are grooved out to the ends laterally, and are recessed for holding the reeds that are slid in, and finally the holes K are drilled, which guide the valve-operating pins. In a reed-board thus constructed the reeds I, when inserted, lie close upon the bottom of the cells with their vibrating tongues above, and no felting is required for closing up leakages. This is of great importance, and obviates the difficulties heretofore experienced by organ-tuners when the felting placed under the heel of the reed was too thick and pitched the tongues downward, thereby affecting the tone of the reed.

Underneath each slat is placed a flat valve, $m$, lined with felt or leather, and guided by projecting studs that pass through holes in said valve. Each valve is held to its seat by a spring, $s$.

J is the key-board, which is secured upon the reed-board H so as to form the ceiling to the reed-cells. An upwardly-projecting strip, $j$, secured against the rear edge of the key-board J, is grooved longitudinally, and into this groove are inserted the beveled rear ends of the keys M so as to have a free oscillating movement therein. Guide-studs for each key are secured upon the key-board, that enter corresponding holes or sockets in the key and hold it laterally in proper position without impeding the swinging movement of the keys. Felt strips are glued upon the key-board, against which the keys will butt without noise, and pins $n$, passed through holes in the key-board J, and through the holes K in the reed-board H, rest upon the valves $m$ and sustain the keys J in such a manner that the depression of any key will open the corresponding valve below the reed-board, allowing a current of air to be drawn through the intermediate reed, and that with releasing said key the valve will close, and thereby it will raise the key again to its elevated position.

N is the bridge-board that conceals the rear ends of the keys, and that at the same time forms the supporting-shelf for sheet-music; and $o$ is a slat lined with felting, against which the beveled portion of the keys will butt when in their elevated position, and will prevent said keys from swinging above the horizontal line. The slat $o$, at both ends, is framed between two key-blocks, O, which by screws are secured upon the ends of the key-board, and the bridge-board N is secured upon said key-blocks O by screws.

P is the cover or lid, which is pivoted between the standards A of the organ-case in such a manner that when closed it will rest with its front edge upon the key-blocks, while a cleat, $p$, secured against the back board, $a$, will cover the upper edge of the lid. When opened the lid will be sustained at an inclined position by its rear edge butting against a shoulder of the bridge-board N, so as to form a music-desk therewith.

Q is the swell-cap, which is pivotally connected to the rear edge of the reed-board H, and is provided with springs that will swing it against the key-board, so as to close the only opening between the reed and key boards through which the sound-waves can escape. This swell-cap Q has a pending arm, $q$, at one end, and the back board, C, of the bellows-reservoir has a projecting pin, $r$, which, with the contraction of the bellows-reservoir, will push said arm $q$ forward, whereby the swell-cap is turned open until its upper edge is in line with the rear edge of the bridge-board N, when the full sound is directed to issue forward from under the said bridge-board. By these simple means the player by pumping more or less air through the feeders, and thereby contracting the bellows-reservoir more or less, not only increases or decreases the power of the air-current that passes through the reeds, but at the same time the tone is proportionally subdued or brought out with full force by the automatic action of the swell-cap, thereby giving expression to the music, the same as in a parlor-organ.

When desirable the swell-cap Q in this organ can be arranged to be operated by an ordinary knee-stop.

By comparing the construction and arrangement of the organ above described with other organs for a like purpose it will be readily seen that this organ is much simpler and far superior in many details, and that by its peculiar action it will afford pleasure, not only to children for whom it is intended, but to adults as well.

This organ is very durable in its parts, and every part is easily accessible for repairs, while its great simplicity of construction enables the manufacturer to sell these organs at a price that is in reach of almost everybody who intends to have his children instructed in music.

What I claim as my invention is—

1. A reed-organ having the bellows-reservoir composed of board B, that forms the front of the organ-case, strip $d$, back board, C, and spring G, all constructed and arranged substantially as set forth.

2. In a reed-organ, the perforated strip $d$ of the bellows-reservoir, and the board $t$ of the feeders D, secured thereto, in combination with the pedals E and E', each rigidly connected with a feeder-board, $t'$, by a block, $u$, all constructed and arranged substantially in the manner described and shown.

3. The combination of the feeders D D', pedals E E', block $u$, base-strip $c$, and wire F, substantially as and for the purpose set forth.

4. The swell-cap Q, pivotally connected to the rear edge of the reed-board H, and having pending arm $q$, in combination with the back board, C, having pin $r$, substantially as and for the purpose described.

5. In a reed-organ, the key-board J, having grooved strip $j$, in combination with the keys M, having tapering rear ends that enter said groove and form a pivotal connection therewith, all substantially as described and shown.

6. In a reed-organ, the combination of the key-board J, reed-board H, bridge-board N, constructed and arranged to conceal the rear ends of the keys and also to form a supporting-shelf for the sheet-music, the swell-cap Q, pivotally connected to said reed-board and having arm $q$, and the back board, C, having pin $r$, substantially as and for the purpose set forth.

7. In a reed-organ, the combination, with the bridge-board N, of the cover or lid P, pivoted above said bridge-board, as described, so that when opened it forms the music-desk, substantially as set forth.

8. The reed-board H, formed of a single piece of wood grooved from the top and slotted in the rear, so as to form reed-cells that are open on top, with side grooves in the bottom for holding the reed, with the front end of the reed-frame close upon the projecting base-strip formed to said board, substantially as set forth.

9. In a reed-organ, the combination of the reed-board H, key-board J, and swell-cap Q, pivotally connected to the rear edge of said reed-board, substantially as and for the purpose described.

10. In a reed-organ, the key-board J, and reed-board H, with pivoted swell-cap Q, having arm $q$, in combination with the back board, C, of the bellows-reservoir, having pin $r$, the same being constructed to operate substantially as set forth.

11. The case for a reed-organ, composed of standards A, back $a$, front B, forming one side of the bellows-reservoir, throat-board $b$, and base-strip $c$, all connected by wood-screws, and constructed in the manner substantially as shown and specified.

AUGUSTUS NEWELL.

Witnesses:
F. W. KASEHAGEN,
ADOLPH LOTZ.